United States Patent
Leitner et al.

(10) Patent No.: US 9,090,488 B2
(45) Date of Patent: Jul. 28, 2015

(54) REACTOR FOR ANAEROBIC PURIFICATION OF WATER

(75) Inventors: Brad Leitner, Appleton, WI (US); Rob Gloudemans, Little Chute, WI (US); Steve Bartsch, Marshfield, WI (US)

(73) Assignee: VOITH MERI ENVIRONMENTAL SOLUTIONS, INC., Appleton, WI (US)

(*) Notice: Subject to any disclaimer, the term of this patent is extended or adjusted under 35 U.S.C. 154(b) by 506 days.

(21) Appl. No.: 13/486,564

(22) Filed: Jun. 1, 2012

(65) Prior Publication Data

US 2013/0319935 A1    Dec. 5, 2013

(51) Int. Cl.
*C02F 3/28* (2006.01)
*C02F 103/28* (2006.01)

(52) U.S. Cl.
CPC ........... *C02F 3/2846* (2013.01); *C02F 2103/28* (2013.01); *Y02W 10/12* (2015.05)

(58) Field of Classification Search
CPC .... C02F 3/2833; C02F 3/2846; C02F 3/2866; C02F 2103/08; Y02W 10/12
USPC ................... 210/603, 252, 259, 928
See application file for complete search history.

(56) References Cited

U.S. PATENT DOCUMENTS

| | | | |
|---|---|---|---|
| 6,478,963 B1 | 11/2002 | Rossmanith | |
| 7,919,000 B2* | 4/2011 | Menke et al. | 210/603 |
| 8,066,877 B2 | 11/2011 | Fuchs et al. | |
| 2008/0277328 A1 | 11/2008 | Zhao et al. | |
| 2009/0211970 A1 | 8/2009 | Verspille et al. | |
| 2011/0236274 A1 | 9/2011 | Buchmueller | |
| 2012/0031835 A1 | 2/2012 | Gommel et al. | |
| 2012/0115218 A1 | 5/2012 | Frankena et al. | |

FOREIGN PATENT DOCUMENTS

| | | |
|---|---|---|
| DE | 198 15 616 A1 | 10/1999 |
| DE | 10 2008 017 008 A1 | 10/2009 |
| DE | 10 2008 061 461 A1 | 6/2010 |
| DE | 10 2009 008 044 A1 | 8/2010 |
| EP | 1 806 324 A1 | 7/2007 |
| EP | 2 248 771 A1 | 11/2010 |
| JP | 2009-178628 A | 8/2009 |

OTHER PUBLICATIONS

International Search Report and Written Opinion for International Application No. PCT/US2013/043411 mailed on Sep. 23, 2013.
English Abstract for JP 2009-178628 A, Aug. 13, 2009.

* cited by examiner

*Primary Examiner* — Fred Prince
(74) *Attorney, Agent, or Firm* — Hershkovitz & Associates, PLLC; Abraham Hershkovitz; Eugene Rzucidlo (57) ABSTRACT

The present invention relates to a reactor for the purification of influent water by means of anaerobic microorganisms comprising at least one separator which is configured so as to separate a three phase mixture withdrawn from the reactor into three phases, namely into sludge, water and gas.

27 Claims, 3 Drawing Sheets

REACTOR FOR ANAEROBIC PURIFICATION OF WATER

The present invention relates to a reactor for the purification of influent water by means of anaerobic microorganisms, to a method for the purification of influent water by means of anaerobic microorganisms and to the use of such a rector for the anaerobic purification of waste water or process water and in particular for the anaerobic purification of waste water or process water in the paper industry.

A plurality of mechanical, chemical and biological processes and corresponding reactors are known for waste water purification. In biological purification processes, the waste water to be purified is brought into contact with aerobic or anaerobic microorganisms which degrade the organic contaminants contained in the waste water primarily to carbon dioxide, biomass and water in the case of aerobic microorganisms and primarily to carbon dioxide and methane and only in a low proportion to biomass in the case of anaerobic microorganisms. In this respect, biological waste water purification methods have increasingly been carried out using anaerobic microorganisms in very recent times because in anaerobic waste water treatment oxygen does not have to be introduced into the bioreactor using high effort in energy, biogas rich in energy is produced in the treatment which can subsequently be used to gain energy and much smaller amounts of excess sludge are produced. Depending on the kind and form of the biomass used, the reactors for anaerobic waste water treatment are divided into contact sludge reactors, UASB reactors ("upflow anaerobic sludge blanker"), EGSB reactors ("expanded granular sludge bed"), fixed bed reactors and fluidized bed reactors. The microorganisms in fixed bed reactors adhere to stationary carrier materials and the microorganisms in fluidized bed reactors adhere to freely movable small carrier material, the microorganisms in the UASB and EGSB reactors are used in the form of so-called pellets. In contrast to UASB reactors, ESBG reactors are higher and have a much smaller foot print for the same volume.

For example, in UASB reactors and EGSB reactors waste water to be purified or a mixture of waste water to be purified and already purified waste water from the outflow of the anaerobic reactor is supplied continuously to the reactor via an inflow in the lower reactor region and is guided through a sludge bed located above the inflow and containing microorganism pellets. During the degradation of the organic compounds contained in the waste water as contaminants, the microorganisms form gas which contains in particular methane and carbon dioxide (which is also referred to as biogas) some of which accumulates at the microorganism pellets in the form of small bubbles and some of which rises upwards in the reactor in the form of free gas bubbles. The specific weight of the pellets falls due to the accumulated gas bubbles so that the pellets rise upward in the reactor. To separate the biogas formed and the rising pellets from the water, separators are arranged in the middle and/or upper parts of the reactor, usually in the form of gas hoods under whose crowns biogas collects which forms a gas cushion under which a flotation layer of microorganism pellets and waste water is located. Purified water liberated from gas and microorganism pellets rises upwardly in the reactor and is drained off via overflows or submerged collection boxes, e.g. pipes with holes, at the upper end of the reactor, whereas the biogas collected at the separator as well as microorganism pellets and waste water from the flotation layer are drained off from the gas hoods of the separator and are conducted upwardly into a two phase separation device as a consequence of an airlift effect. The separation device is arranged on the top of the reactor. In the two phase separation device gas is separated from the water and the microorganisms, wherein the gas is removed, while the suspension composed of the microorganisms and the water is returned via a downer line into the lower part of the anaerobic reactor. This recirculation of suspension is important in order to assure a possible high mixing of the components of the medium contained in the reactor, i.e. of microorganism pellets and water, as a consequence of the flow generated at the exit of downer line and the area around it. Such a high mixing of the single components of the medium contained in the reactor is important, in order to assure a continuous homogenous contact between the contaminated water and the microorganism which is an essential precondition for an efficient purification of the water, i.e. for an efficient conversion of the chemical oxygen demand (COD) to biogas. In contrast to this, an insufficient contact between the contaminated water and the microorganisms leads to a low mixing or inhomogeneous distribution of the contaminated water, which in turn leads to a locally partially conversion of COD and to the generation of an uneven distribution of the biogas production, which would lead to a decrease of purification efficiency of the reactor.

Such a reactor and a corresponding method are described, for example, in U.S. Pat. No. 8,066,877 B2.

However, during the operation of the aforementioned reactor the extent of the recirculation of sludge via the riser line, the separation device and the downer line in the reactor depends on the concentration of contamination and in particular on the concentration of organic pollutants contained in the influent water to be purified, which is usually expressed in terms of the COD. The higher the COD is, the higher the amount of gas produced per unit time in the reactor is and thus the higher the degree of recirculation via the riser line, the separation device and the downer line. Due to this an only incomplete mixing of the single components of the medium contained in the reactor, i.e. water, microorganism pellets and gas, is obtained, if the COD of the water to be purified is too low, so that only comparably low volumes of biogas are generated in the reactor. On the other hand, a too high degree of recirculation of the components results, if the COD of the water to be purified is too high so that comparably high volumes of biogas are generated in the reactor. Both, a too high as well as a too low degree of recirculation in the reactor are disadvantageous, because of the generation of inequilibrated zones which have no or a too low mixing distribution or a bad exchange between organic contaminants and the microorganism, respectively, leading to a high local concentration of organic contaminants which may even create upset conditions for the microorganism which may lead to a low purification efficiency in the reactor. If the degree of recirculation is too low, a significant number of microorganism pellets sediments and no longer contributes to the purification. However, if the degree of recirculation is too high, the turbulence of the medium contained in the reactor is too high so that at least some of the microorganism pellets are destroyed. This also leads to a low purification efficiency in the reactor.

In view of this the object of the present invention is to provide a reactor by means of which the aforesaid disadvantages can be avoided. More specifically, the reactor shall allow—independently from the degree of pollution of the influent water—a homogenous mixing of the single components of the medium contained in the reactor under avoidance of high turbulences in the reactor medium and under avoidance of significant sedimentation of solids contained in the reactor medium, i.e. the reactor shall be capable of being easily controlled with regard to the degree of homogenization of the medium contained in the reactor and to the flow conditions in the reactor independently from the quality of the influent water or possible changes of the quality of the influent water during the reactor operation.

In accordance with the present invention this object is satisfied by a reactor for the purification of influent water by means of anaerobic microorganisms comprising:
a) a reactor tank,
b) at least one feeder line for the supply of influent water to be treated into the reactor,
c) at least one water collection device arranged at the upper region of the reactor tank for the draining away of treated water,
d) at least one gas collection device arranged at a level below the water collection device for collecting a three phase mixture containing gas, solids and water from the medium contained in the reactor,
e) at least one separator arranged at a level above the water collection device,
f) at least one riser line leading from the gas collection device to the separator for conducting the three phase mixture into the separator and
g) at least one downer line leading from the separator directly or indirectly into the lower part of the reactor tank,
wherein the at least one separator is configured so as to separate the three phase mixture coming from the riser line into three phases, namely into i) sludge, ii) water and iii) gas.

This solution is based on the finding that an excellent control of the degree of homogenization of the medium contained in the reactor and of the flow conditions in the reactor independently from the degree of pollution of the influent water and respective biogas production is achievable by separating the three phase mixture entering into the separator from the riser line (s) into the three phases sludge, water and gas. This because in the present case—in contrast to the reactors known from the prior art—not only suspension and biogas is obtained in the separator, but three phases, namely biogas, sludge which is recirculated via the downer line into the lower part of the reactor, and water which is used separately for the controlled recirculation to assure the best possible mixing distribution and contact of the components in the reactor under all operational conditions. Thereby, it is possible that the proportion of the water obtained in the separator, which is recirculated into the reactor, can be adjusted in dependence of the COD of the influent water according to the requirement, i.e. so that exactly that water volume is recirculated into the reactor leading to the optimal degree of homogenization of the medium contained in the reactor and the optimal flow conditions in the reactor as a consequence of the flow generated at the exit of recirculated water and the area around it. If the COD of the influent water changes during the operation of the reactor, the recirculation volume of the water obtained in the separator into the reactor can be adapted accordingly. The rest of the water, i.e. the proportion of the water obtained in the separator which is not recirculated into the reactor, may be removed from the reactor as purified clear water together with the clear water obtained in the water collection device. In contrast to this, during the operation of the reactors known in the prior art comprising a two phase separator all of the suspension has to be completely recirculated via the downer line into the reactor which leads at a high COD or a high biogas production, respectively, in the lower downer outlet area to a local overload, or which leads at a low COD or a low biogas production, respectively, to a low mixing distribution leading to a decreased purification efficiency in the reactor.

According to the present invention, sludge is defined as a solid/liquid mixture having a comparable high solid content, wherein water is defined as pure water or a solid/water mixture having a comparable low solid content. Therefore, according to the present invention the separator of the reactor is configured so as to separate the three phase mixture coming from the riser line(s) into sludge, water and gas, wherein the ratio of the solid concentration in the sludge to the solid concentration of the water is at least 2. Particularly good results are achieved, if the separator of the reactor is configured so as to separate the three phase mixture coming from the riser line into sludge, water and gas, wherein the ratio of the solid concentration in the sludge to the solid concentration of the water is at least 3, even more preferably at least 4 and most preferably between 5 and 10. The solid concentration of sludge and water is measured by filling 1 l sludge or water, respectively, into an imhoff funnel and by letting the medium 0.5 hours stand still to allow the solids to settle, before the solid content is read on the scale of the funnel.

Moreover, according to the present invention, gas is defined as gas containing no or at most low amounts of solid and liquid components. Therefore, according to the present invention the separator of the reactor is configured so as to separate the three phase mixture coming from the riser line into sludge, water and gas containing less than 100 g/m$^3$ solid and liquid components. Particularly good results are achieved if the separator of the reactor is configured so as to separate the three phase mixture into sludge, water and gas containing less than 60 g/m$^3$ solid and liquid components, even more preferably gas containing less than 50 g/m$^3$ solid and liquid components and still more preferably gas containing at most 40 g/m$^3$ solid and liquid components.

In principle, the present invention is not limited to the type of three phase separator as long as it is able of achieving the aforementioned three phase separation. A preferred example of a respective separator is a cyclone.

In a further development of the idea of the invention it is proposed that the separator of the reactor comprises at least one double cyclone, with the double cyclone meaning any cyclone which comprises at least two containers each having a lower part which tapers downwardly.

According to a particularly preferred embodiment of the present invention, the three phase separator comprises an outer container having a lower part tapering downwardly, at least one inlet line for the three phase mixture which merges tangentially into the outer container, at least one outlet line for sludge which merges into the downer line, at least one outlet line for water and at least one outlet line for gas. This is a specific kind of a cyclone. The lower part tapering downwardly may, for example, be a conical part or a part having a convex cross section.

In the aforementioned embodiment, the separator preferably further comprises an inner container having a lower part tapering downwardly, with the inner container being arranged concentrically in the outer container so as to form a cylindrical annular space between the outer container and the inner container. This is a specific kind of a double cyclone leading to a particularly efficient three phase separation even under a high throughput. While the solid phase, i.e. sludge, is separated from the three phase mixture in the annular space between the outer container and the inner container, the so obtained two phase mixture then passes into the inner container, where gas is separated upwardly and water is separated downwardly in the inner container.

The lower end of the preferably conically tapering lower part of the inner container is preferably connected with the outlet line for water.

In order to obtain a particularly good gas separation in the inner container of the separator, it is preferred that the separator further comprises a hollow cylindrical pipe comprising a lower end and an upper end, wherein the lower end of the hollow cylindrical pipe is arranged concentrically in the upper part of the inner container so as to form, in the upper part of the inner container, a cylindrical annular space between the inner container and the hollow cylindrical pipe, whereas the upper end of the hollow cylindrical pipe is arranged outside above the inner container. As mentioned above, the water flows downwardly in the inner container, whereas the gas flows upwardly through the central opening of the hollow cylindrical pipe, thus leading to a separation of the two aforementioned phases.

The upper end of the hollow cylindrical pipe is preferably connected with the at least one outlet line for gas.

In order to be able to control the proportion of the water obtained in the separator which is recirculated into the reactor—for example in dependence of the COD of the influent water—according to the need, it is suggested according to a further particularly preferred embodiment of the present invention that the reactor further comprises at least one standpipe arranged outside the reactor tank, wherein the three phase separator contains an outlet line for water, which is connected with the at least one standpipe. The standpipe functions as a reservoir collecting the water withdrawn from the three phase separator, wherein—in dependency of the COD of the influent water and in dependency of other operation parameters—the necessary volume of water can be drained off of this reservoir and recirculated into the reactor in order to adjust in the reactor an optimal mixing degree of the components and to adjust in the reactor optimal flow conditions.

In order to achieve the aforementioned result, the reactor preferably further comprises at least one supply line, wherein each of the at least one supply line merges into one or more of the at least one feeder line for the supply of influent water to be purified into the reactor. In this manner, a particularly good homogenization of the medium contained in the reactor can be obtained.

Moreover, it is preferred that each of the at least one feeder line for the supply of influent water to be purified in the reactor comprises a valve allowing the control of the amount of flow of influent water into the reactor.

Additionally, it may be advantageous if the reactor tank further comprises at least one feeder distributor for the mixing of the influent water supplied to the reactor with the medium located in the reactor, in order to even improve the distribution of the influent water in the medium contained in the reactor.

Moreover, the present invention relates to a method for the purification of influent water by means of anaerobic microorganisms comprising the step of operating the aforementioned reactor.

Preferably, the method is conducted such that the three phase mixture coming from the riser line(s) is separated in the separator into sludge, water and gas, wherein the gas contains less than 100 $g/m^3$ solid and liquid components.

According to an even more preferred embodiment of the present invention the three phase mixture coming from the riser line(s) is separated in the separator into sludge, water and gas, wherein the gas contains less than 60 $g/m^3$ solid and liquid components.

According to a particular preferred embodiment of the present invention the three phase mixture coming from the riser line(s) is separated in the separator into sludge, water and gas, wherein the gas contains less than 50 $g/m^3$ and even more preferably at most 40 $g/m^3$ solid and liquid components.

In a further development of the idea of the invention it is proposed that the water obtained in the three phase separator is partially recirculated into the reactor. The volume of the recirculated water may be, for example, controlled by means of one or more valves provided in the recirculation line.

The reactor according to the present invention is particularly suitable to be used for the anaerobic purification of waste water or process water and preferably for the anaerobic purification of waste water or process water in the paper industry.

The present invention will be described in the following purely by way of example with reference to advantageous embodiments and to the enclosed drawings.

There are shown.

Figure 1:
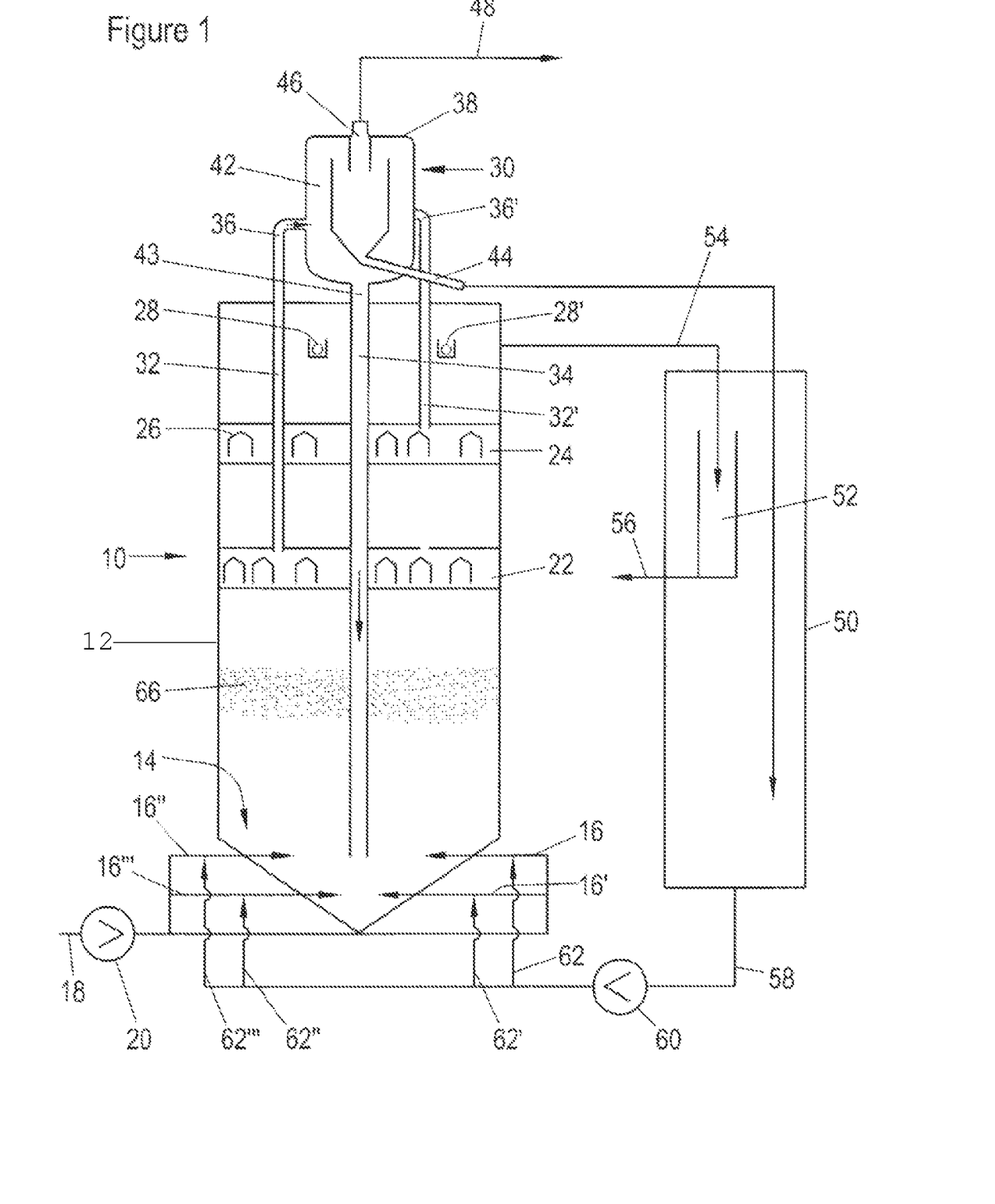
FIG. 1 a schematic longitudinal sectional view of a reactor for the purification of influent water by means of anaerobic microorganisms in accordance with a first embodiment of the present invention.

The anaerobic bioreactor 10 shown schematically in longitudinal section in FIG. 1 includes a reactor tank 12 which is made cylindrical in its middle and upper part and converges downwardly in a conical form in its lower part 14. A plurality of feeder lines 16, 16', 16'', 16''' for the supply of influent water to be purified into the reactor merges into the lower part 14 of the reactor tank 12. These feeder lines 16, 16', 16'', 16''' all diverge from the central feeder line 18, through which influent water is supplied to the reactor tank 12 via the inflow pump 20.

Two gas collection devices 22, 24, which each comprise a plurality of gas hoods 26, are located in the middle and upper regions of the reactor tank 12. In practice, each of the gas collection devices 22, 24 comprises a plurality of layers of gas hoods 26; in FIG. 1, however, only one layer of gas hoods 26 is shown per gas collection device 22, 24 for reasons of simplicity. Alternatively to this, the reactor can also include only one gas collection device 22, 24 instead of two different gas collection devices 24, 26. As water collection devices overflows 28, 28' or submerged boxes with holes, e.g. pipes, via which the treated water is drawn off from the reactor 10 are located above the upper gas collection device 24.

A three phase separator 30 is arranged on the reactor tank 12 and is connected via the riser lines 32, 32' to the two separators 22, 24, wherein the upper ends of both riser lines 32, 32' merge into the three phase separator 30 function as inlet lines 36, 36'. The three phase separator 30 comprises an outer container 38 and an inner container 40, wherein the lower parts of both containers 38, 40 taper conically downwardly. The inner container 40 is concentrically arranged in the outer container 38 so that a cylindrical annular space 42 is formed between the outer container 38 and the inner container 40. The lower end of the outer container 38 merges into the downer line 34 so that the entrance of the downer line 34 is the outlet line 43 for sludge of the three phase separator 30. Moreover, the lower end of the inner container 40 merges into an outlet line 44 for water of the three phase separator 30. At the top of the three phase separator 30 a hollow cylindrical pipe 46 is arranged, which is connected with an outlet line 48 for gas of the three phase separator 30.

Additionally, the reactor 10 comprises a standpipe 50, which is connected with the three phase separator 30 via the outlet line 44 for water of the three phase separator 30. In the standpipe 50 a further pipe 52 is arranged, into which a line 54 merges, which is connected with the clear water collection devices 28, 28' in order to supply clear water into this pipe 52.

The lower end of pipe 52 is connected with a clear water removal line 56. Moreover, a supply line 58 is provided at the lower end of the standpipe 50, which is connected with the feeder lines 16, 16', 16", 16''' via a pump 60 and lines 62, 62', 62", 62'''. All feeder lines 16, 16', 16", 16''' and/or lines 62, 62', 62", 62''' are provided with valves (not shown), by means of which the flow through these lines can be controlled.

Figure 2:
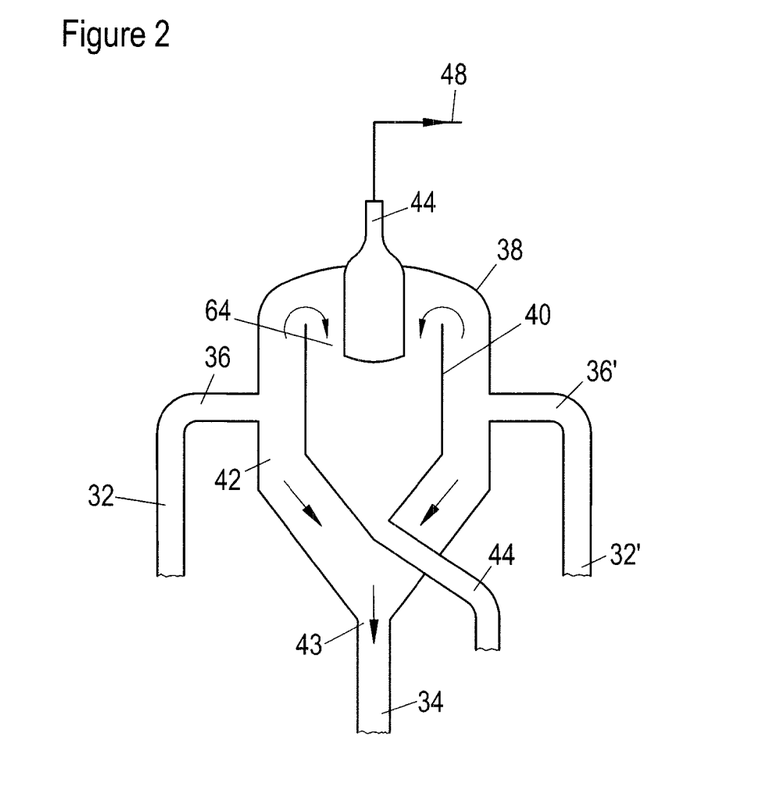
FIG. 2 a schematic longitudinal sectional view of the three phase separator of the reactor shown in FIG. 1 and FIG. 3 a schematic cross sectional view of the three phase separator of the reactor shown in FIG. 1.
Figure 3:
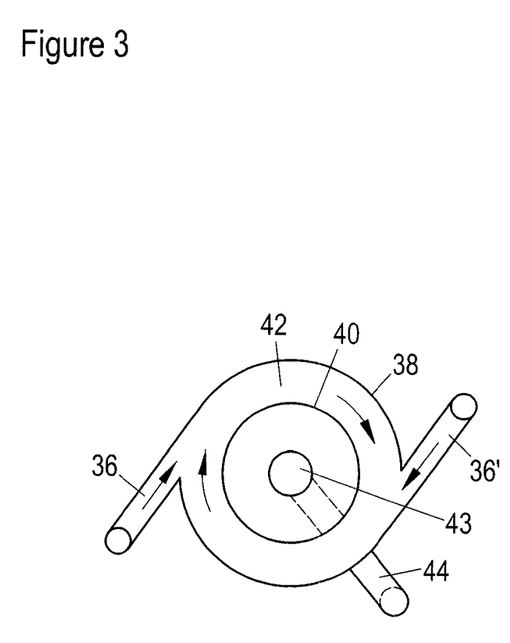

An enlargement of the three phase separator 30 is shown in FIG. 2 and a cross section of the three phase separator 30 is shown in FIG. 3. As described above, the hollow cylindrical pipe 46 comprises a lower end and an upper end. The lower end of the hollow cylindrical pipe 46 is arranged concentrically in the upper part of the inner container 40 so as to form a cylindrical annular space 64 between the inner container 40 and the hollow cylindrical pipe 46 in the upper part of the inner container 40. In contrast to this the upper end of the hollow cylindrical pipe 46 is arranged outside above the inner container 40.

In the operation of the reactor, waste water to be purified is introduced into the reactor tank 12 via the central feeder line 18 and the feeder lines 16, 16', 16", 16'''. As a consequence of the flow generated at the exits of the feeder lines 16, 16', 16", 16''' the medium of the reactor is homogeneously mixed. The waste water introduced flows slowly upwardly in the reactor tank 12 until it moves into the fermentation zone containing pellets 66 containing microorganisms. The microorganisms contained in the pellets 66 primarily decompose the organic contaminants contained in the waste water to methane gas and carbon dioxide gas. Gas bubbles arise due to the gases generated, the larger ones of which are released from the pellets and bubble through the medium in the form of gas bubbles, whereas small gas bubbles remain stuck to the sludge pellets. The water and those pellets to which small gas bubbles stick and which therefore have a lower specific weight than the other pellets rise up in the reactor tank 12 until they reach the lower gas collection device 22.

The free gas bubbles are captured in the gas hoods 26 and form a gas cushion beneath the roof of the gas hoods 26. A flotation layer comprising microorganism pellets with small gas bubbles adhering thereto is formed directly beneath the gas cushion. The gas collected in the gas hoods 26 as well as pellets and water from the flotation layer are, for example, drained off from the gas hoods 26 via an opening (not shown) present in the end face of the gas hoods 26, and the gas, pellets and water are optionally mixed with one another via a mixing chamber (not shown) and are guided due to the airlift effect via the riser line 32 into the gas separation device 30.

The water, the microorganism pellets 66 and the gas bubbles which were not already separated in the lower gas collection device 22 continue to rise upwardly in the reactor tank 12 up to the upper gas collection device 24. Due to the reduction in the hydrostatic pressure between the lower gas collection device 22 and the upper gas collection device 24, the last small gas bubbles are released from the microorganism pellets 66 which have entered into the upper gas collection device 24 so that the specific weight of the pellets 66 increases again and the pellets 66 sink downwardly. The remaining gas bubbles are caught in the gas hoods 26 of the upper gas collection device 24 and are in turn guided into a gas collection line at the end faces of the individual gas hoods 26. The gas is guided via the riser line 32' into the gas separator 30 from the gas collection line. The now treated water continues to rise upwardly from the upper gas collection device 24 until it is drawn away from the reactor 10 via the overflows 28, 28' or submerged boxes with holes, e.g. pipes.

The three phases, namely pellets 66 and other solids containing sludge, water and gas, are separated in the three phase separator 30 from one another. More specifically, the three phase mixture enters into the cylindrical annular space 42 formed between the outer container 38 and the inner container 40 of the three phase separator 30 through the inlet lines 36, 36', which tangentially merge into the outer container 38. Due to the centrifugal force acting on the solids, the solid particles come into contact with the wall of the outer container 38 and are thus decelerated, whilst they settle down to the lower end of the outer container 38 into the downer line 34. The sludge is then recirculated into the lower part of the reactor tank 12 through the downer line 38. As a consequence of the flow generated at the exit of the downer line and the area around it, this recirculation of sludge contributes to the mixing of the components contained in the medium contained in the reactor. The mixture comprising the remaining two phases moves upwardly in the cylindrical annular space 42 until it flows tangentially over the upper end of the wall of the inner tank 40 into the cylindrical annular space 64 formed between the inner container 40 and the hollow cylindrical pipe 46. Thereby, a vortex is formed in the annular space 42 as a consequence of which pure gas enters into the hollow cylindrical pipe 46 upwardly and leaves the three phase separator 30 via the outlet line 48. In contrast to this, pure water flows into the lower part of the inner tank 40 and from there into the standpipe 50 via the outlet line 44. From this standpipe a controlled volume of water is conducted via pump 60 and lines 58, 62, 62', 62", 62''' into the feeder lines 16, 16', 16", 16''', in order to contribute to desired flow conditions and a desired homogenization degree in the reactor.

Clear water from the overflows 28, 28' is guided into the further pipe 52 arranged in the standpipe 50 via line 54 and is withdrawn from this pipe 52 and from the reactor 10 via outlet line 56. If the water level in the standpipe 50 increases until the upper end of the wall of the further pipe 52, water flows from standpipe 50 into the further pipe 52 and is then withdrawn together with the clear water coming from line 54 via outlet line 56.

Thus, the volume of recirculated water can be controlled in dependency of the COD of the influent water, so that at any time the homogenization degree of the medium contained in the reactor and the flow conditions in the reactor can be controlled independently from the degree of pollution of the influent water. Moreover, the reactor according to the present invention allows a mixing of the influent water with recirculated clear water before the supply of this mixture into the reactor 10 which is connected with significant process advantages. Namely, the incoming influent water having a high organic contaminant load is mixed with purified water having a lower COD which allows to adjust an optimized operational environment for the microorganism in the reactor. Furthermore, the mixing or dilution, respectively, of the influent water with the externally recirculated water adjusts a desired degree of alkalinity. The so obtained better conditioned feed water can then be introduced into the reactor at multiple points assuring a homogeneous load and an even conditions of all microorganism. Finally, the reactor according to the present invention allows the separation of microorganism pellets and flocculent solids.

REFERENCE NUMERAL LIST 10 (bio)reactor
12 reactor tank
14 lower, funnel-shaped reactor tank part
16, 16', 16", 16''' feeder lines
18 central feeder line
20 inflow pump 22 lower gas collection device
24 upper gas collection device
26 gas hood
28, 28' water collection device/overflow
30 three phase separator
32, 32' riser line
34 downer line
36, 36' inlet line to the three phase separator
38 outer container
40 inner container
42 cylindrical annular space in the outer container
43 outlet line for sludge of the three phase separator
44 outlet line for water of the three phase separator
46 hollow cylindrical pipe
48 outlet line for gas of the three phase separator
50 standpipe
52 further pipe
54 line
56 clear water removal line
58 supply line
60 pump
62, 62', 62", 62''' line
64 cylindrical annular space in the inner container
66 microorganism-containing pellets

The invention claimed is:

1. A reactor (10) for the purification of influent water by means of anaerobic microorganisms comprising:
   a) a reactor tank (12),
   b) at least one feeder line (16, 16', 16", 16''') for the supply of influent water to be treated into the reactor (10),
   c) at least one water collection device (28, 28') arranged at the upper region of the reactor tank (12) for the draining off away treated water,
   d) at least one gas collection device (22, 24) arranged at a level below the water collection device (28, 28') for collecting a three phase mixture containing gas, solids and water from the medium contained in the reactor (10),
   e) at least one separator (30) arranged at a level above the water collection device (28, 28'),
   f) at least one riser line (32, 32') leading from the was collection device (22, 24) to the separator (30) for conducting the three phase mixture into the separator (30) and
   g) at least one downer line (34) leading from the separator (30) directly or indirectly into the lower part (14) of the reactor tank (12),
   wherein the separator (30) is configured so as to separate the three phase mixture coming from the at least one riser line (32, 32') into sludge, water and gas, wherein the ratio of the solid concentration in the sludge to the solid concentration of the water is at least 2, and wherein the gas contains less than 100 g/m$^3$ solid and liquid components.

2. The reactor (10) according to claim 1, wherein the separator (30) is configured so as to separate the three phase mixture coming from the at least one riser line (32, 32') into sludge, water and gas, wherein the ratio of the solid concentration in the sludge to the solid concentration of the water is between 5 and 10, and wherein the gas contains less than 50 g/m$^3$ solid and liquid components.

3. The reactor (10) according to claim 1, wherein the separator (30) comprises at least one double cyclone.

4. The reactor (10) according to claim 1, wherein the separator (30) comprises an outer container (38) having a lower part tapering downwardly, at least one inlet line (36, 36') for the three phase mixture which merges tangentially into the outer container (38), at least one outlet line (43) for sludge which merges into the downer line (34), at least one outlet line (44) for water and at least one outlet line (48) for gas.

5. The reactor (10) according to claim 4, wherein the separator (30) further comprises an inner container (40) having a lower part tapering downwardly, wherein the inner container (40) is arranged concentrically in the outer container (38) so as to form a cylindrical annular space (42) between the outer container (38) and the inner container (40).

6. The reactor (10) according to claim 5, wherein the lower end of the conical tapering lower part of the inner container (40) is connected with the outlet line for water.

7. The reactor (10) according to claim 6, wherein the upper end of the hollow cylindrical pipe (46) is connected with the at least one outlet line (48) for gas.

8. The reactor (10) according to claim 5, wherein the separator (30) further comprises a hollow cylindrical pipe (46) comprising a lower end and an upper end, wherein the lower end of the hollow cylindrical pipe (46) is arranged concentrically in the upper part of the inner container (38) so as to form in the upper part of the inner container (38) a cylindrical annular space (64) between the inner container (38) and the hollow cylindrical pipe (46), whereas the upper end of the hollow cylindrical pipe is arranged outside above the inner container (40).

9. The reactor (10) according to claim 1, further comprising at least one standpipe (50) arranged outside the reactor tank (12), wherein the separator (30) contains an outlet line (44) for water, which is connected with the at least one standpipe (50).

10. The reactor (10) according to claim 9, further comprising at least one supply line (58, 62, 62', 62", 62'''), wherein each of the at least one supply line (58, 62, 62', 62", 62''') merges into one or more of the at least one feeder line (16, 16', 16", 16''') for the supply of influent water to be treated into the reactor (10).

11. The reactor (10) according to claim 1, wherein each oldie at least one feeder line (16, 16', 16", 16''') thr the supply of influent water to be treated in the reactor (10) comprises a valve allowing the control of the amount of flow of influent water into the reactor (10).

12. The reactor (10) according to claim 1, wherein the reactor tank (12) further comprises at least one feeder distributor for the mixing of the influent water supplied to the reactor (10) with the medium located in the reactor (10).

13. The reactor (10) according to claim 1, wherein the separator (30) comprises at least one double cyclone.

14. A reactor (10), for the purification of influent water by means of anaerobic microorganisms comprising:
   a) a reactor tank (12),
   b) at least one feeder line (16, 16', 16", 16''') for the supply of influent water to be treated into the reactor (10),
   c) at least one water collection device (28, 28') arranged at the upper region of the reactor tank (12) for the draining off away treated water,
   d) at least one gas collection device (22, 24) arranged at a level below the water collection device (28, 28') for collecting a three phase mixture containing gas, solids and water from the medium contained in the reactor (10),
   e) at least one separator (30) arranged at a level above the water collection device (28, 28'),
   f) at least one riser line (32, 32') leading from the gas collection device (22, 24) to the separator (30) for conducting the three phase mixture into the separator (30) and g) at least one downer line (34) leading from the separator (30) directly or indirectly into the lower part (14) of the reactor tank (12), wherein the at least one separator (30) is configured so as to separate the three phase mixture coming from the riser line (32, 32') into three phases, namely into i) sludge, ii) water and iii) gas and wherein the separator (30) comprises at least one cyclone.

15. The reactor (10) according to claim 14, wherein the separator (30) is configured so as to separate the three phase mixture coming from the at least one riser line (32, 32') into sludge, water and gas, wherein the ratio of the solid concentration in the sludge to the solid concentration of the water is at least 2, and wherein the gas contains less than 100 g/m$^3$ solid and liquid components.

16. The reactor (10) according to claim 14, wherein the separator (30) is configured so as to separate the three phase mixture coming from the at least one riser line (32, 32') into sludge, water and gas, wherein the ratio of the solid concentration in the sludge to the solid concentration of the water is between 5 and 10, and wherein the gas contains less than 50 g/m$^3$ solid and liquid components, wherein the separator (30) comprises an outer container (38) having a lower part tapering downwardly, at least one inlet line (36, 36') for the three phase mixture which merges tangentially into the outer container (38), at least one outlet line (43) for sludge which merges into the downer line (34), at least one outlet line (44) for water and at least one outlet line (48) for gas, wherein the separator (30) further comprises an inner container (40) having a lower part tapering downwardly, wherein the inner container (40) is arranged concentrically in the outer container (38) so as to form a cylindrical annular space (42) between the outer container (38) and the inner container (40).

17. The reactor (10) according to claim 16, wherein the lower end of the conical tapering lower part of the inner container (40) is connected with the outlet line for water.

18. The reactor (10) according to claim 14, further comprising at least one standpipe (50) arranged outside the reactor tank (12), wherein the separator (30) contains an outlet line (44) for water, which is connected with the at least one standpipe (50) and at least one supply line (58, 62, 62', 62", 62'''), wherein each of the at least one supply line (58, 62, 62', 62", 62''') merges into one or more of the at least one feeder line (16, 16', 16", 16''') for the supply of influent water to be treated into the reactor (10).

19. The reactor (10) according to claim 14, wherein each of the at least one feeder line (16, 16', 16", 16''') for the supply of influent water to be treated in the reactor (10) comprises a valve allowing the control of the amount of flow of influent water into the reactor (10).

20. The reactor (10) according to claim 14, wherein the reactor tank (12) further comprises at least one feeder distributor for the mixing of the influent water supplied to the reactor (10) with the medium located in the reactor (10).

21. A method for the purification of influent water by means of anaerobic microorganisms comprising the step of operating a reactor (10) comprising:
    a reactor tank (12),
    b) at least one feeder line (16, 16', 16", 16''') thr the supply of influent water to be treated into the reactor (10),
    c) at least one water collection device (28, 28') arranged at the upper region of the reactor tank (12) for the draining, off away treated water,
    d) at least one gas collection device (22, 24) arranged at a level below the water collection device (28, 28') for collecting a three phase mixture containing gas, solids and water from the medium contained in the reactor (10),
    e) at least one separator (30) arranged at a level above the water collection device (28, 28),
    f) at least one riser line (32, 32') leading from the gas collection device (22, 24) to the separator (30) for conducting the three phase mixture into the separator (30) and
    g) at least one downer line (34) leading from the separator (30) directly or indirectly into the lower part (14) of the reactor tank (12), wherein the three phase mixture coming from the at least one riser line (32, 32') is separated in the separator (30) into sludge, water and gas, wherein the ratio of the solid concentration in the sludge to the solid concentration of the water is at least 2, and wherein the gas contains less than 100 g/m$^3$ solid and liquid components.

22. The method according to claim 21, wherein the three phase mixture coming from the at least one riser line (32, 32') is separated in the separator (30) into sludge, water and gas, wherein the ratio of the solid concentration in the sludge to the solid concentration of the water is at least 4, and wherein the gas contains less than 60 g/m$^3$ solid and liquid components.

23. The method according to claim 21, wherein the three phase mixture coming from the at least one riser line (32, 32') is separated in the separator (30) into sludge, water and gas, wherein the ratio of the solid concentration in the sludge to the solid concentration of the water is between 5 and 10, and wherein the gas contains at most 40 g/m$^3$ solid and liquid components.

24. The method according to claim 21, wherein the water obtained in the three phase separator (30) is at least partially recirculated into the reactor.

25. A method for the purification of influent water by means of anaerobic microorganisms comprising the step of operating a reactor (10) comprising:
    a) a reactor tank (12),
    b) at least one feeder line (16, 16', 16", 16''') for the supply of influent water to be treated into the reactor (10),
    c) at least one water collection device 28, 28') arranged at the upper region of the reactor tank (12) for the draining off away treated water,
    d) at least one gas collection device (22, 24) arranged at a level below the water collection device (28, 28') for collecting a three phase mixture containing gas, solids and water from the medium contained in the reactor (10),
    e) at least one separator (30) arranged at a level above the water collection device (28, 28'),
    f) at least one riser line (32, 32') leading from the gas collection device (22, 24) to the separator (30) for conducting the three phase mixture into the separator (30) and
    g) at least one downer line (34) leading from the separator (30) directly or indirectly into the lower part (14) of the reactor tank (12), wherein the at least one separator (30) is configured so as to separate the three phase mixture coming from the riser line (32, 32') into three phases, namely into i) sludge, ii) water and iii) gas and wherein the separator (30) comprises at least one cyclone.

26. The method according to claim 25, wherein the three phase mixture coming from the at least one riser line (32, 32') is separated in the separator (30) into sludge, water and gas, wherein the ratio of the solid concentration in the sludge to the solid concentration of the water is at least 2, and wherein the gas contains less than 100 g/m³ solid and liquid components.

27. The method according to claim 25, wherein the three phase mixture coming from the at least one riser line (32, 32') is separated in the separator (30) into sludge, water and gas, wherein the ratio of the solid concentration in the sludge to the solid concentration of the water is at least 4, and wherein the gas contains less than 60 g/m³ solid and liquid components.

\* \* \* \* \*